US 9,555,779 B2

United States Patent
Oshio et al.

(10) Patent No.: US 9,555,779 B2
(45) Date of Patent: Jan. 31, 2017

(54) ELECTRIC PARKING BRAKE DEVICE

(71) Applicant: ADVICS CO., LTD., Kariya (JP)

(72) Inventors: Yusuke Oshio, Anjo (JP); Jin Yamada, Anjo (JP); Tetsuaki Tsuzuki, Gamagori (JP); Kentaro Yuasa, Tokai (JP); Keiichi Shino, Tokai (JP)

(73) Assignee: ADVICS CO., LTD., Aichi-Pref, Kariya (JP)

( * ) Notice: Subject to any disclaimer, the term of this patent is extended or adjusted under 35 U.S.C. 154(b) by 0 days.

(21) Appl. No.: 14/285,188

(22) Filed: May 22, 2014

(65) Prior Publication Data

US 2014/0345989 A1 Nov. 27, 2014

(30) Foreign Application Priority Data

May 22, 2013 (JP) ................ 2013-107810
Aug. 9, 2013 (JP) ................ 2013-166109

(51) Int. Cl.
*F16D 125/40* (2012.01)
*B60T 7/10* (2006.01)
(Continued)

(52) U.S. Cl.
CPC ............. *B60T 7/107* (2013.01); *B60T 13/741* (2013.01); *B60T 13/746* (2013.01); *F16D 51/20* (2013.01);
(Continued)

(58) Field of Classification Search
CPC ...... B60T 7/107; B60T 13/741; B60T 13/746; F16D 51/20; F16D 2121/24; F16D 2125/40; F16D 2125/48; F16D 2125/64
(Continued)

(56) References Cited

U.S. PATENT DOCUMENTS 5,310,026 A * 5/1994 Shaw .................. B60T 13/741
188/156
5,377,789 A * 1/1995 Brooks, Sr. ............. F16C 1/12
188/106 A
(Continued)

FOREIGN PATENT DOCUMENTS

JP 11-105680 A 4/1999

*Primary Examiner* — Thomas Irvin (74) *Attorney, Agent, or Firm* — Buchanan Ingersoll & Rooney PC (57) ABSTRACT

Provided is an electric parking brake device in which a parking lever is driven by an electric actuator. The electric actuator includes: an electric motor which can be rotationally driven in a normal/reverse direction and of which an operation is controlled by a motor control unit in accordance with rotational loads; a converting mechanism which can convert a rotational movement into a linear movement and which can move the parking lever from a returning position to an operating position in accordance with normal rotation of the electric motor and which can move the parking lever from the operating position to the returning position in accordance with reverse rotation of the electric motor; and a load applying mechanism (a stopper, a friction material) which drives components of the converting mechanism and which applies predetermined rotational loads to the electric motor, in a state where the parking lever is moved from the operating position to the returning position in accordance with reverse rotation of the electric motor.

2 Claims, 8 Drawing Sheets

(51) Int. Cl.
B60T 13/74 (2006.01)
F16D 51/20 (2006.01)
F16D 121/24 (2012.01)
F16D 125/48 (2012.01)
F16D 125/64 (2012.01)

(52) U.S. Cl.
CPC ....... *F16D 2121/24* (2013.01); *F16D 2125/40* (2013.01); *F16D 2125/48* (2013.01); *F16D 2125/64* (2013.01)

(58) Field of Classification Search
USPC .............. 188/79, 325, 323, 333, 79.55, 162, 328, 188/158, 156
See application file for complete search history.

(56) References Cited

U.S. PATENT DOCUMENTS

| | | | | |
|---|---|---|---|---|
| 6,364,085 B1* | 4/2002 | Ueno | .................... | B60T 13/741 188/156 |
| 6,446,768 B2* | 9/2002 | Kikuta | ................. | B60T 13/746 188/156 |
| 6,651,782 B2* | 11/2003 | Asai | ......................... | F16C 1/12 188/106 A |
| 6,877,592 B2* | 4/2005 | Ikeda | ..................... | F16D 65/22 188/325 |
| 7,484,432 B2* | 2/2009 | Yamanaka | ............ | B60T 11/046 188/2 D |
| 7,648,006 B2* | 1/2010 | Deutloff | ................. | B60T 7/107 188/156 |
| 8,011,482 B2* | 9/2011 | Boyle | ................... | B60T 13/746 188/156 |
| 8,186,485 B2* | 5/2012 | Park | ..................... | B60T 13/746 188/162 |
| 8,235,181 B2* | 8/2012 | Sano | ..................... | B60T 13/746 188/156 |
| 8,607,938 B2* | 12/2013 | Lee | ....................... | B60T 11/046 188/162 |
| 8,662,263 B2* | 3/2014 | Deutloff | ........................ | 188/162 |
| 9,097,300 B2* | 8/2015 | Akada | ...................... | F16D 51/50 188/162 |
| 9,211,877 B2* | 12/2015 | Deutloff | ................... | B60T 7/085 |
| 2007/0240950 A1* | 10/2007 | Deutloff | ................... | B60T 7/107 188/265 |
| 2009/0260929 A1* | 10/2009 | Boyle | ................... | B60T 13/746 188/156 |
| 2010/0219029 A1* | 9/2010 | Deutloff | ................... | B60T 7/085 188/2 D |
| 2011/0094838 A1* | 4/2011 | Haack | ..................... | B60T 7/108 188/325 |
| 2012/0193178 A1* | 8/2012 | Yamada | .................. | F16D 51/20 188/162 |
| 2014/0020997 A1* | 1/2014 | Bach | ........................ | F16D 51/16 188/325 |
| 2014/0027221 A1* | 1/2014 | Akada | .................... | F16D 51/50 188/325 |

\* cited by examiner

NORMAL ROTATION

ELECTRIC PARKING BRAKE DEVICE

TECHNOLOGICAL FIELD

The present invention relates to an electric parking brake device and, particularly, relates to an electric parking brake device having a configuration in which, when a parking lever in a drum brake is driven from a returning position to an operating position in accordance with normal driving of an electric actuator, a brake shoe is driven from the returning position to the operating position and, when the parking lever is driven from the operating position to the returning position in accordance with reverse driving of the electric actuator, the brake shoe is driven from the operating position to the returning position.

BACKGROUND DISCUSSION

An electric parking brake device of such a type has been disclosed in, for example, JP11-105680A. In the electric parking brake device, when a parking brake switch is operated, an electric actuator can perform a normal driving operation, and thus a parking lever can be driven from the returning position to the operating position (that is, the parking brake is switched to an operating state). Furthermore, when the parking brake switch is released, the electric actuator can perform a reverse driving operation, and thus the parking lever can be driven from the operating position to the returning position (that is, the parking brake is switched to a released state (a non-operating state)).

According to the description of the above-described electric parking brake device disclosed in JP11-105680A, when an electric motor provided in the electric actuator rotates in a normal direction, the electric actuator can perform the normal driving operation. Then, when electric current equal to or more than a predetermined value flows to the electric motor in a normal rotating state, the electric motor is stopped. As a result, a fixed parking-brake force can be always obtained. Furthermore, according to the description, when the electric motor provided in the electric actuator rotates in a reverse direction, the electric actuator can perform the reverse driving operation. Then, when electric current flowing to the electric motor in a reverse rotating state reaches no-load current, power of the electric motor is turned off.

The above-described electric parking brake device disclosed in JP11-105680A has an advantage (which is an advantage that it is not necessary to provide a sensor for electrically detecting a state of the parking lever) in that operating/stopping of the electric motor can be controlled using a current value flowing to the electric motor. However, a return spring which biases a brake shoe to the returning position is generally provided in the brake shoe of the drum brake. Accordingly, when the parking brake is released, the reverse driving operation of the electric actuator is assisted by the return spring.

Thus, there is a concern that a time at which electric current flowing to the electric motor in the reverse rotating state reaches the no-load current may be different from a time at which the parking lever returns to the returning position. Accordingly, there is a concern that, when the parking brake is released, inadequate return or excess return of the parking lever may occur. When inadequate return of the parking brake occurs, failure, such as brake drag, is caused. In addition, when excess return of the parking lever occurs, failure, such as response delay when performing a subsequent parking brake operation, is caused.

SUMMARY

The invention is made to solve the problems described above (that is, the invention is intended to prevent inadequate return or excess return of the parking lever from occurring during a releasing operation of the parking brake). According to an aspect of the invention, there is provided an electric parking brake device in which, when a parking lever in a drum brake is driven from a returning position to an operating position in accordance with a normal driving of an electric actuator, a brake shoe is driven from the returning position to the operating position and, when the parking lever is driven from the operating position to the returning position in accordance with a reverse driving of the electric actuator, the brake shoe is driven from the operating position to the returning position, in which the electric actuator includes:

an electric motor which can be rotationally driven in a normal/reverse direction and of which an operation is controlled by a motor control unit in accordance with rotational loads;

a converting mechanism which can convert a rotational movement into a linear movement and which can move the parking lever from the returning position to the operating position during a normal drive mode in which the electric motor rotates in the normal direction, and which can move the parking lever from the operating position to the returning position during a reverse drive mode in which the electric motor rotates in the reverse direction; and a load applying mechanism which drives components of the converting mechanism and which applies predetermined rotational loads to the electric motor, in a state where the parking lever is moved from the operating position to the returning position in accordance with reverse rotation of the electric motor.

In the electric parking brake device of the invention described above, the motor control unit causes the electric motor to rotate in the normal direction in accordance with an operation of a parking brake switch and the motor control unit causes the electric motor in a normal rotating state to be stopped by means of an electric current value which is obtained when the rotational loads acting on the electric motor in the normal rotating state reach a setting value. Accordingly, the parking brake can be operated. In this case, when the parking brake switch is operated, the electric motor rotates in the normal direction and the parking lever in the returning position is driven from the returning position to the operating position, in accordance with normal-driving of the electric actuator. As a result, the brake shoe is driven from the returning position to the operating position. In this case, the electric motor in the normal rotating state is stopped by means of the current value which is obtained when the rotational loads (which are loads obtained when the brake shoe moves to the operating position and comes into pressure-contact with the brake drum) acting on the electric motor in the normal rotating state reach the setting value. As a result, a fixed parking-brake force can be always obtained.

The motor control unit causes the electric motor to rotate in the reverse direction in accordance with a release of the parking brake switch and the motor control unit causes the electric motor in a reverse rotating state to be stopped by means of a current value which is obtained when the rotational loads acting on the electric motor in the reverse rotating state reach a predetermined value. Accordingly, the parking brake can be released. In this case, when the parking brake switch is released, the electric motor rotates in the reverse direction and the parking lever in the operating position is driven from the operating position to the returning position, in accordance with reverse-driving of the electric actuator. As a result, the brake shoe is driven from the operating position to the returning position. In this case, the electric motor in the reverse rotating state is stopped by means of the electric current value which is obtained when the rotational loads (which are loads obtained by the load applying mechanism) acting on the electric motor in the reverse rotating state reach the predetermined value. As a result, the parking lever can be stopped always in a state where the parking lever is returned to a predetermined returning position. Thus, in the electric parking brake device of the invention, when the parking brake is released, it is possible to prevent inadequate return or excess return of the parking lever. Thus, it is possible to prevent failure (for example, brake drag) caused by inadequate return of the parking lever and it is possible to prevent failure (for example, response delay when performing a subsequent parking brake operation) caused by excess return of the parking lever. Furthermore, the electric parking brake device of the invention has an advantage (an advantage that it is not necessary to provide a sensor for electrically detecting a state of the parking lever) in that operating/stopping of the electric motor can be controlled using the current value flowing to the electric motor.

DETAILED DESCRIPTION

Hereinafter, embodiments of the invention will be described with reference to the accompanying drawings. FIGS. 1 to 4 illustrate Embodiment 1 of an electric parking brake device. The electric parking brake device of Embodiment 1 includes a drum brake 10 having a parking brake device and an electric actuator 20 which drives the parking brake device.

Figure 1:
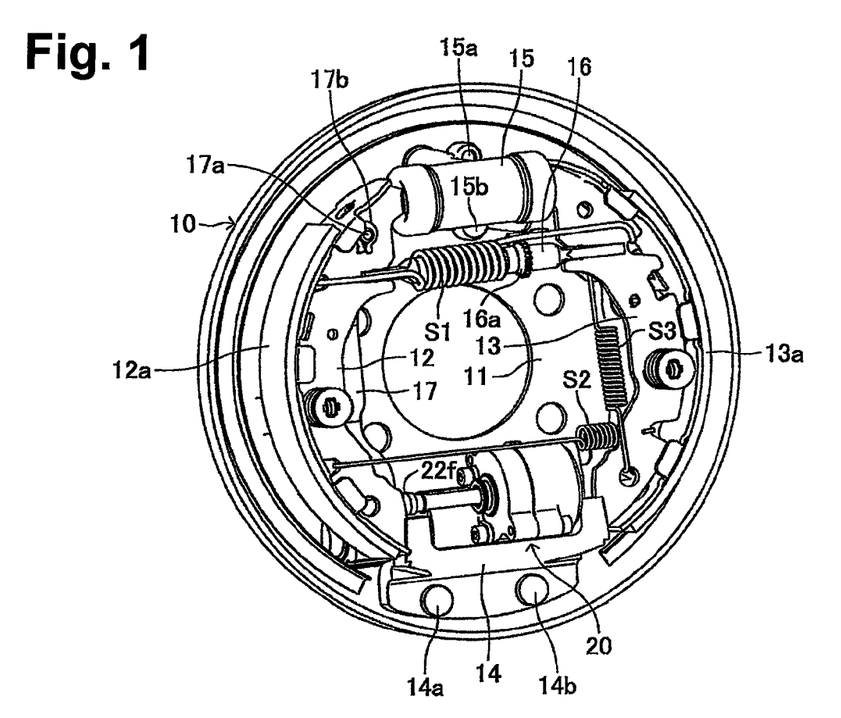
FIG. 1 is a perspective view illustrating Embodiment 1 of an electric parking brake device according to the invention.
Figure 2:
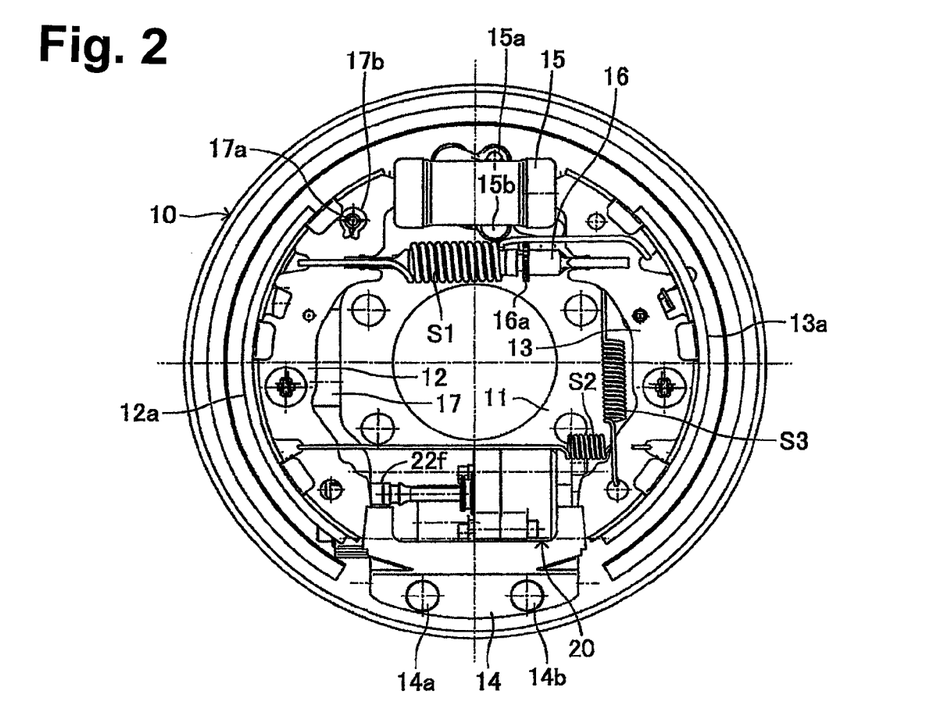
FIG. 2 is a front view of the electric parking brake device illustrated in FIG. 1.

The drum brake 10 includes a back plate 11 having a disk shape, a pair of brake shoes 12, 13 installed in the back plate 11, an anchor block 14, a wheel cylinder 15, and the like, as illustrated in FIGS. 1 and 2. The back plate 11 is configured to be fixed to a mounting portion (not illustrated) on a vehicle body side.

The respective brake shoes 12, 13 are installed in a state where the brake shoes 12, 13 can move in a certain direction (a direction along a plate surface), relative to the back plate 11. The brake shoes 12, 13 integrally include linings 12a, 13a having a circular arc shape. When a brake is operated, the linings 12a, 13a are pressed to a brake drum (not illustrated). In addition, a linking member 16 having an adjustment mechanism and return springs S1, S2 are installed in a portion between the brake shoes 12 and 13.

In the brake shoe 12 on a left side in FIGS. 1 and 2, an upper end is engaged with a left-side piston (not illustrated) of the wheel cylinder 15 and a lower end is engaged with the anchor block 14. When the brake is operated, the brake shoe 12 is pressed to a left side in an expanded manner so as to be moved towards the brake drum (not illustrated). Furthermore, a parking lever 17 is oscillatably installed in the brake shoe 12.

Meanwhile, in the brake shoe 13 on a right side in FIGS. 1 and 2, an upper end is engaged with a right-side piston (not illustrated) of the wheel cylinder 15 and a lower end is engaged with the anchor block 14. When the brake is operated, the brake shoe 13 is pressed to a right side in an expanded manner so as to be moved toward to the brake drum (not illustrated). Furthermore, a return spring S3 (in which an upper end is engaged to the back plate 11 and a lower end is engaged to the brake shoe 13) is installed in the brake shoe 13.

The anchor block 14 is fixed to a lower portion (in the drawings) of the back plate 11, using a pair of fasteners 14a, 14b. The wheel cylinder 15 is fixed to an upper portion (in the drawings) of the back plate 11, using a pair of fasteners 15a, 15b. A pair of right and left pistons (not illustrated) are accommodated in the wheel cylinder 15. When the brake is operated, the pair of right and left pistons respectively move to the right and left sides so as to be spaced apart from each other and allow the left and right brake shoes 12, 13 to be expanded.

In the linking member 16, a left end portion is tiltably engaged with an upper portion of the brake shoe 12 and, also, is tiltably engaged with an upper portion of the parking lever 17 and a right end portion is tiltably engaged with an upper portion of the brake shoe 13. The length of the linking member 16 can be automatically adjusted (extended) in accordance with wear amounts of the linings 12a, 13a, using a known adjustment mechanism 16a.

Figure 3:
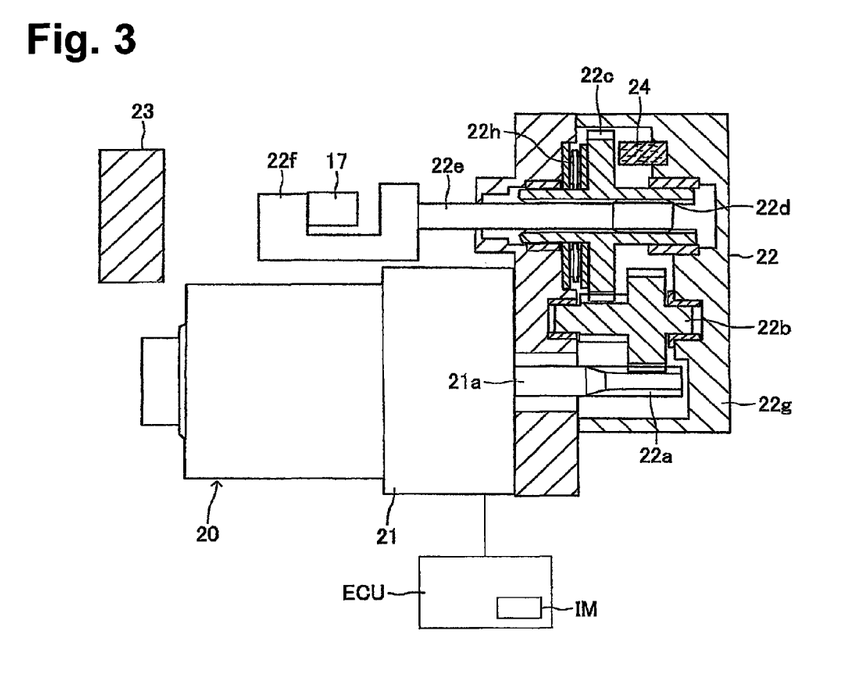
FIG. 3 is a cross-sectional view which schematically illustrates the configuration (which is in a state in which a parking lever is driven from a returning position to an operating position in accordance with a normal driving of the electric actuator) of an electric actuator in the electric parking brake device illustrated in FIGS. 1 and 2.

The parking lever 17 is disposed along the brake shoe 12 on the left side in the drawings. An upper end portion of the parking lever 17 is tiltably (rotatably) linked to the brake shoe 12, using a pin 17a and a clip 17b. Furthermore, a lower end of the parking lever 17 is engaged with a holder 22f in the electric actuator 20, as illustrated in FIG. 3. The parking lever 17 is driven (rotatably driven around the pin 17a) in a right-left direction by the holder 22f.

The electric actuator 20 is provided in the drum brake 10, as illustrated in FIGS. 1 and 2. The electric actuator 20 includes an electric motor 21, a converting mechanism 22, a stopper 23 functioning as a load applying mechanism, and a friction material 24, as illustrated in FIG. 3. The electric motor 21 can be rotationally driven in a normal/reverse direction. The operation of the electric motor 21 is controlled by a motor control unit (an electric control unit) ECU, by means of an electric current value corresponding to rotational loads. The electric current value corresponding to the rotational loads can be detected by an electric current monitor IM provided in the motor control unit (the electric control unit) ECU.

The converting mechanism 22 can convert a rotational movement of the electric motor 21 into a linear movement (a tilting movement of the parking lever 17) of a tilting end (a portion illustrated in FIG. 3) of the parking lever 17. During a normal drive mode in which the electric motor 21 rotates in a normal direction, the converting mechanism 22 can cause the parking lever 17 to move from a returning position (a position illustrated in FIG. 4) to an operating position (a position illustrated in FIG. 3). During a reverse drive mode in which the electric motor 21 rotates in a reverse direction, the converting mechanism 22 can cause the parking lever 17 to move from the operating position to the returning position.

The converting mechanism 22 includes a pinion 22a which is integrally provided on a rotating shaft 21a of the electric motor 21, an intermediate gear 22b which is rotatably driven by the pinion 22a, an output gear 22c which is rotatably driven by the intermediate gear 22b, a screw mechanism 22d which is formed in a center (a shaft center) portion of the output gear 22c, a rod 22e which is linked to the output gear 22c through the screw mechanism 22d, and the holder 22f which is integrally provided in a tip end of the rod 22e and which can be engaged/disengaged with/from the parking lever 17 and of which a rotational movement is regulated by the parking lever 17.

The intermediate gear 22b and the output gear 22c are rotatably installed in a housing 22g. A thrust bearing 22h is installed in a portion between the output gear 22c and the housing 22g, to receive a reaction force (a force directed to the left side in FIG. 3) from the parking lever 17. The output gear 22c can move in an axial direction, relative to the housing 22g. The electric motor 21 and the housing 22g are fixed to the back plate 11, using fasteners (not illustrated).

The screw mechanism 22d is constituted by a female thread portion formed in the center (the shaft center) portion of the output gear 22c and a male thread portion formed in a right end of the rod 22e. The male thread portion is screwed to the female thread portion. In the screw mechanism 22d, rotation (the rotational movement) of the output gear 22c is converted into an axial movement (a linear movement) of the rod 22e. Furthermore, in the screw mechanism 22d, the aspects of leads of the female thread portion and the male thread portion are properly set such that, when the reaction force is applied from the parking lever 17, the output gear 22c is prevented from rotating.

Figure 4:
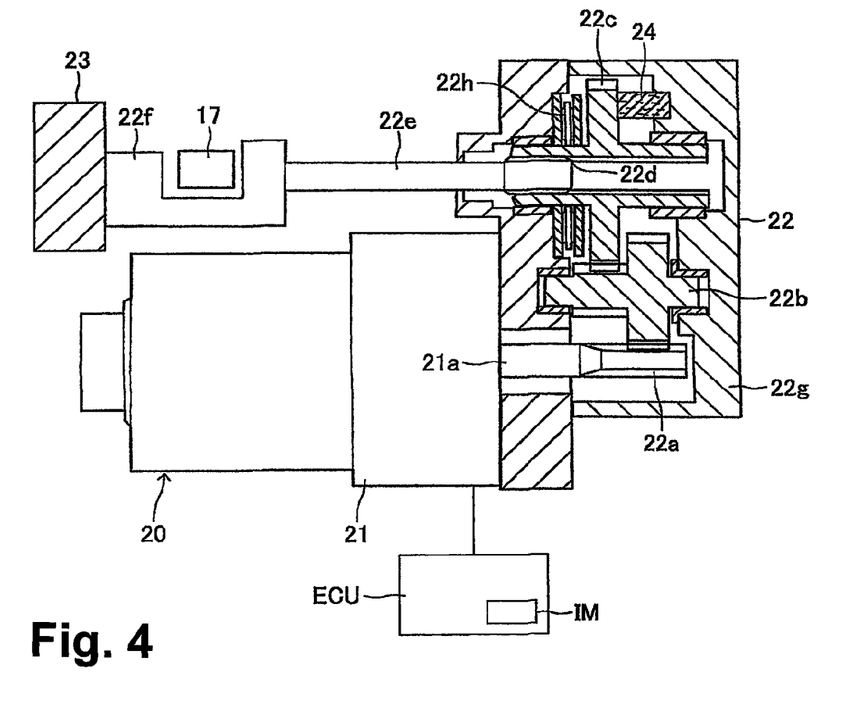
FIG. 4 is a cross-sectional view illustrating an operating state (in which the parking lever is returned to the returning position in accordance with reverse driving of the electric actuator and predetermined rotational loads are obtained in a load applying mechanism) of the electric actuator illustrated in FIG. 3.

The stopper 23 and the friction material 24, both of which function as a load applying mechanism, are operated after the parking lever 17 moves from the operating position to the returning position. The stopper 23 is fixed to the back plate 11, using a fastener (not illustrated) and the friction material 24 is fixed to the housing 22g. As illustrated in FIG. 4, when the parking lever 17 moves from the operating position to the returning position, the stopper 23 engages with the holder 22f in a state where the holder 22f is separated (that is, the engagement is released between the holder 22f and the parking lever 17) from the parking lever 17 and regulates or restricts the axial movements of the holder 22f and the rod 22e in a returning direction (the left side in the drawing).

When the output gear 22c rotates in the reverse direction, the rod 22e and the holder 22f, both of which are in the state illustrated in FIG. 3, move to the left side in the drawing, and thus the parking lever 17 moves from the operating position to the returning position. Then, the holder 22f is engaged with the stopper 23, and thus the axial movement of the holder 22f is regulated or restricted. Therefore, the output gear 22c moves from the returning position illustrated in FIG. 3 in an operating direction (to the right side in the drawing), as illustrated in FIG. 4. At this time, the friction material 24 engages with the output gear 22c and applies rotational loads to the output gear 22c.

The motor control unit (the electric control unit) ECU has functions described below. One is a function in which, when the rotational loads reach a setting value (which is obtained when the parking lever 17 moves to the operating position, as illustrated in FIG. 3) during a normal rotation drive mode of the electric motor 21, the operation of the electric motor 21 is stopped. The other one is a function in which, when the rotational loads reach a predetermined value (which is obtained when the output gear 22c engages with the friction material 24, as illustrated in FIG. 4) during a reverse rotation drive mode of the electric motor 21, the operation of the electric motor 21 is stopped.

The motor control unit (the electric control unit) ECU is also connected to a parking brake switch (not illustrated) provided in a driver seat of the vehicle. When the parking brake switch is operated, the electric motor 21 starts the normal rotation drive mode and, when the parking brake switch is released, the electric motor 21 starts the reverse rotation drive mode.

In the electric parking brake device of Embodiment 1 having the configuration described above, when the parking brake switch is operated and the electric motor 21 starts the normal rotation drive mode, the electric actuator 20 is switched from the state illustrated in FIG. 4 to the state illustrated in FIG. 3, and thus the parking lever 17 moves from the returning position to the operating position. In this case, the parking lever 17 illustrated in FIGS. 1 and 2 tilts, against an operation of the return springs S1, S2, and S3, in a counter-clockwise rotating direction. Accordingly, the lining 13a of the brake shoe 13 on the right side in the drawing is pressed to the brake drum (not illustrated) through the linking member 16 and, also, the lining 12a of the brake shoe 12 on the left side in the drawing is pressed to the brake drum through the pin 17a. As a result, parking braking is applied. When the parking lever 17 moves to the operating position, the rotational loads (loads obtained when the brake shoes 12, 13 move to the operating position and the linings 12a, 13a come into pressure-contact with the brake drum) due to the normal rotation driving of the electric motor 21 reach the setting value. As a result, the operation of the electric motor 21 is stopped by the motor control unit (the electric control unit) ECU.

On the contrary, when the parking brake switch is released and the electric motor 21 starts the reverse rotation drive mode, the electric actuator 20 is switched from the state illustrated in FIG. 3 to the state illustrated in FIG. 4, and thus the parking lever 17 is moved, by the operation of the return springs S1, S2, and S3, from the operating position to the returning position. In this case, the parking lever 17 illustrated in FIGS. 1 and 2 tilts in a clockwise rotating direction so as to move from the operating position to the returning position. Accordingly, the brake shoes 12, 13 on the left and right sides in the drawing return to the returning positions, and thus parking braking is released. When the parking lever 17 moves to the returning position, the output gear 22c engages with the friction material 24. Therefore, the rotational loads (which are loads obtained by the load applying mechanism (the stopper 23 and the friction material 24)) due to the reverse rotation driving of the electric motor 21 reach the predetermined value. As a result, the operation of the electric motor 21 is stopped by the motor control unit (the electric control unit) ECU.

Meanwhile, in the Embodiment 1, the electric motor 21 in the normal rotating state is stopped, by the motor control unit (electric control unit) ECU, by means of an electric current value which is obtained when the rotational loads (which are loads obtained when the brake shoes 12, 13 move to the operating positions and the linings 12a, 13a come into pressure-contact with the brake drum) acting on the electric motor 21 in the normal rotating state reaches the setting value. Thus, a fixed parking-brake force can be always obtained. In addition, the electric motor 21 in the reverse rotating state is stopped, by the motor control unit (electric control unit) ECU, by means of an electric current value which is obtained when the rotational loads (which are loads obtained by the load applying mechanism) acting on the electric motor 21 in the reverse rotating state reaches the predetermined value. Thus, the parking lever 17 can be stopped always in a state where the parking lever 17 is returned to a predetermined returning position.

Accordingly, in the Embodiment 1, when the parking brake is released, it is possible to prevent inadequate return or excess return of the parking lever 17. Thus, it is possible to prevent failure (for example, brake drag) caused by inadequate return of the parking lever 17 and it is possible to prevent failure (for example, response delay when performing a subsequent parking brake operation) caused by excess return of the parking lever 17. Furthermore, the Embodiment 1 has an advantage (which is an advantage that it is not necessary to provide a sensor for electrically detecting a state of the parking lever 17) in that operating/stopping of the electric motor 21 can be controlled using the current value flowing to the electric motor 21.

Figure 5:
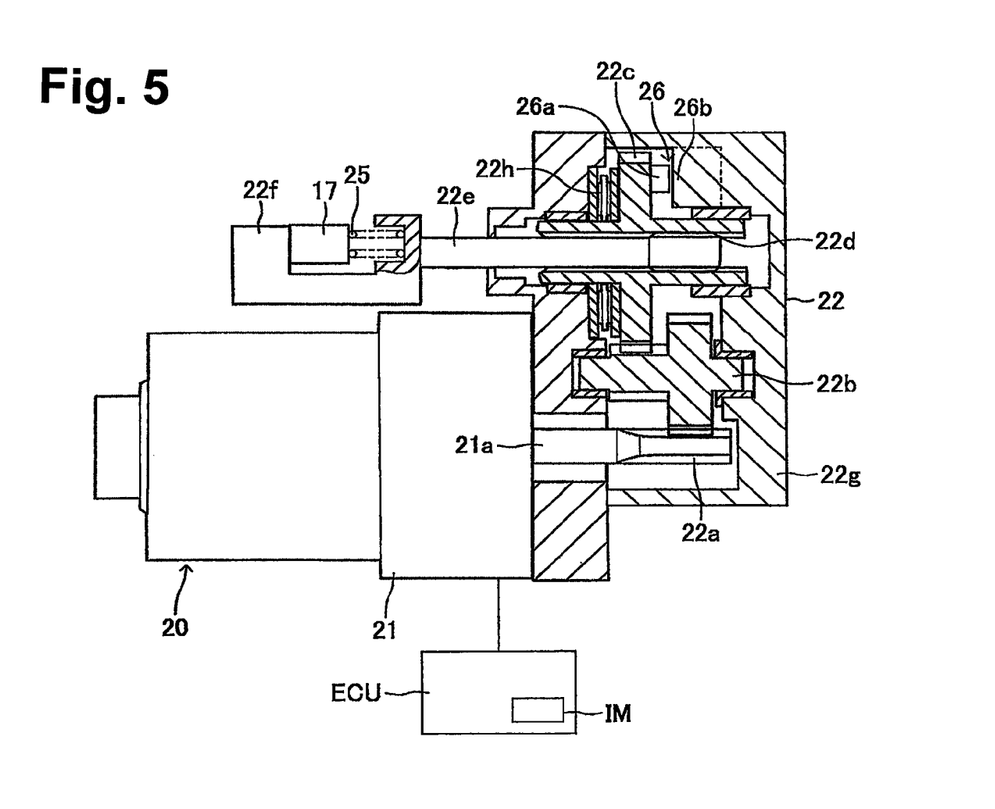
FIG. 5 is a cross-sectional view which illustrates Embodiment 2 of the electric parking brake device according to the invention and corresponds to the illustration of FIG. 3.
Figure 6:
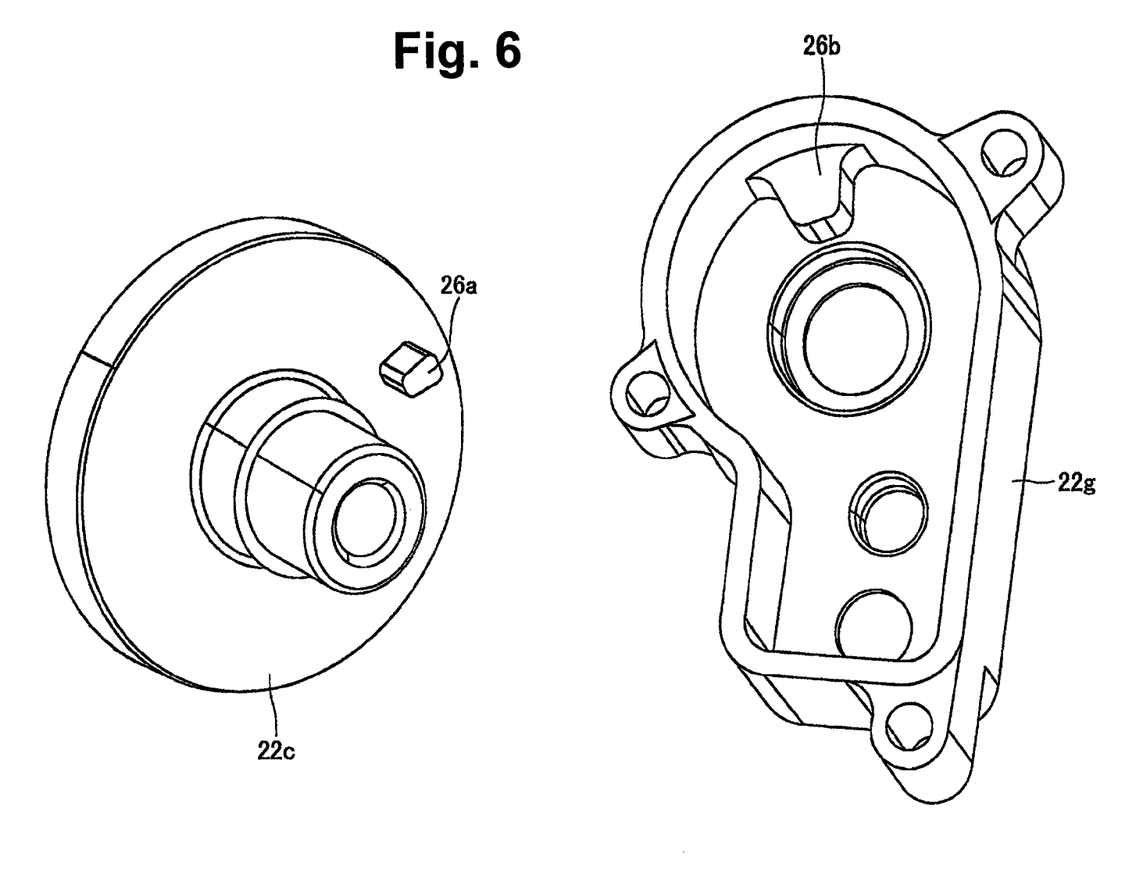
FIG. 6 is an exploded perspective view illustrating the configuration of a rotation stopper illustrated in FIG. 5.

In the Embodiment 1 described above, the load applying mechanism is constituted by the stopper 23 and the friction material 24. However, the load applying mechanism may be constituted by a biasing member 25 and a rotation stopper 26, as an Embodiment 2 illustrated in FIGS. 5 to 7. The biasing member 25 and the rotation stopper 26 are operated after the parking lever 17 moves from the operating position to the returning position. The biasing member 25 is provided in a portion between the parking lever 17 and the holder 22f and the rotation stopper 26 is provided in a portion between the output gear 22c and the housing 22g.

The biasing member 25 is constituted by a compression coil spring. The biasing member 25 is provided, in a compressed state, in a portion between the parking lever 17 and the holder 22f. The biasing member 25 has a function (a function for elastically regulating the movement of the holder 22f and the rod 22e to the left side in FIG. 5) that, when the parking lever 17 moves to the returning position and the reaction force (a force directed to the left side in FIG. 5) is lost, the holder 22f and the rod 22e are elastically held with respect to the parking lever 17. Therefore, in a state where the parking lever 17 moves to the returning position, reverse rotation of the output gear 22c causes the output gear 22c to axially move to the right side in FIG. 5.

Figure 7:
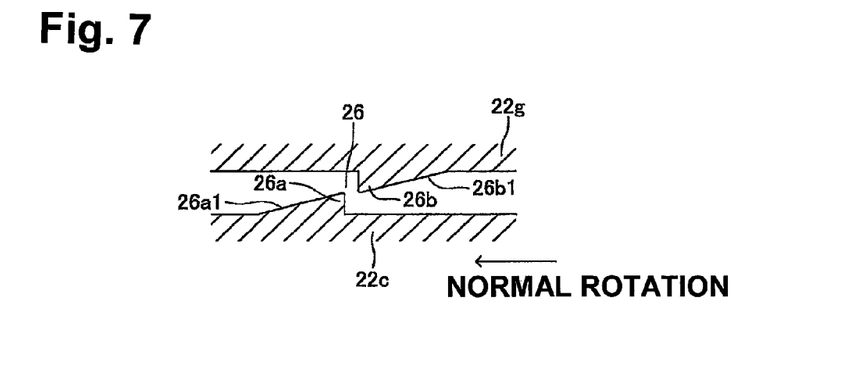
FIG. 7 is a cross-sectional view, taken along a line in a rotation direction, which exaggeratedly illustrates the configuration of the rotation stopper illustrated in FIG. 5.

The rotation stopper 26 is constituted by a protrusion portion 26a formed on the output gear 22c and a protrusion portion 26b formed on the housing 22g. In the rotation stopper 26 described above, when the parking lever 17 moves to the returning position, and then the output gear 22c rotates in the reverse direction and axially moves to the right side in FIG. 5 (that is, when the output gear 22c moves from the returning position in the operating direction), the protrusion portion 26a engages with the protrusion portion 26b. Accordingly, the rotational loads are applied to the output gear 22c. Inclined surfaces 26a1, 26b1 are formed on one sides of the protrusion portion 26a and the protrusion portion 26b in rotational directions thereof, as illustrated in FIG. 7. Thus, when the output gear 22c rotates in the normal direction, and thus the engagement is released between the protrusion portion 26a and the protrusion portion 26b, the engagement therebetween is easily released.

In the embodiments described above, the screw mechanism 22d of the converting mechanism 22 is constituted by the female thread portion formed on the output gear 22c and the male thread portion formed on the rod 22e. However, a screw mechanism of the converting mechanism may be constituted by a male thread portion formed on an output gear and a female thread portion formed on a rod. Furthermore, in the embodiments described above, the rod 22e and the holder 22f are separate members and can be integrally linked. However, a holder portion (which is a member corresponding to the holder 22f) may be integrally formed on an end portion of a rod.

In the embodiments described above, the stopper 23 or the biasing member 25 is applied as means for moving the output gear 22c from the returning position in the operating direction, in a state where the parking lever 17 is moved from the operating position to the returning position. However, instead of the stopper 23 or the biasing member 25, a helical thread which allows an output gear (22c) to move from the returning position in the operating direction may be formed on a meshing portion between an intermediate gear (22b) and the output gear (22c).

In the Embodiment 1 described above, the stopper 23 and the friction material 24 are applied. However, instead of the stopper 23, the biasing member 25, for example, may be applied. Furthermore, instead of the friction material 24, the rotation stopper 26, for example, may be applied. In the Embodiment 2, the biasing member 25 and the rotation stopper 26 are applied. However, instead of the biasing member 25, the stopper 23, for example, may be applied. Furthermore, instead of the rotation stopper 26, the friction material 24 may be applied.

Figure 8:
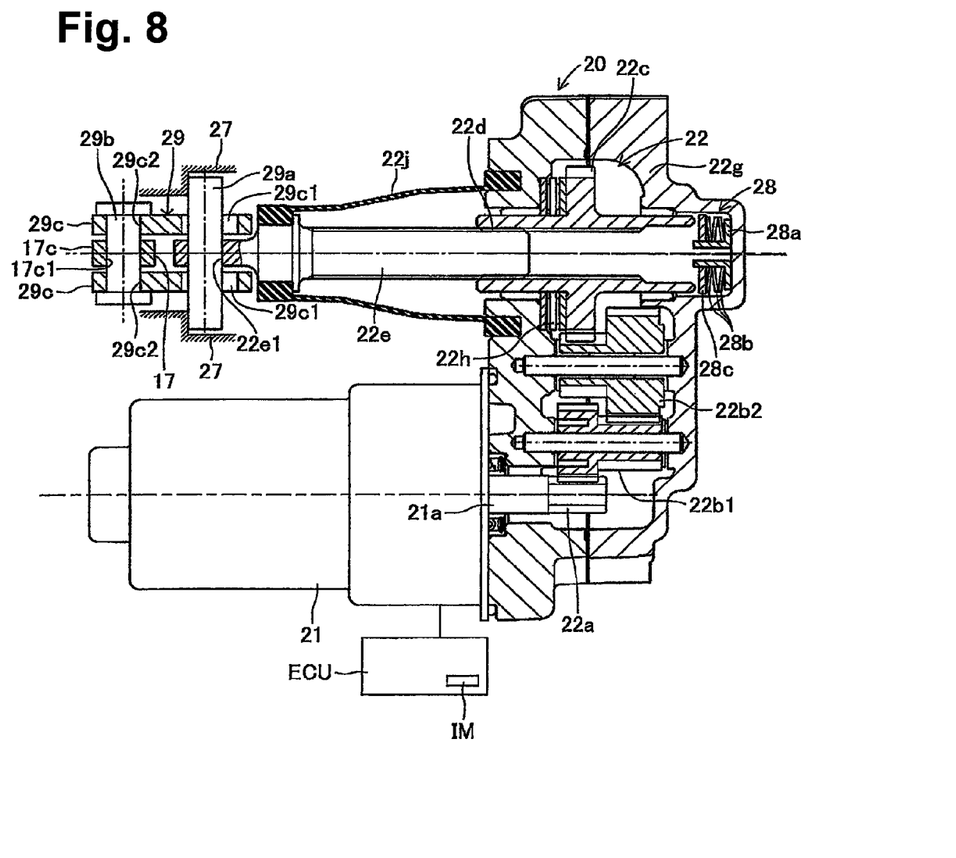
FIG. 8 is a cross-sectional view which illustrates Embodiment 3 of the electric parking brake device according to the invention and corresponds to the illustration in FIG. 3, in which a linking portion between the parking lever and rod shows a cross-sectional plan view taken along the line 8-8 in FIG. 9.
Figure 9:
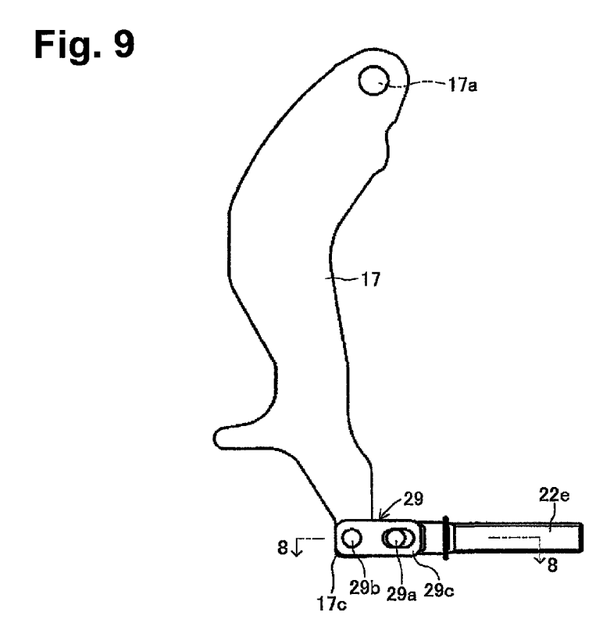
FIG. 9 is a front view which illustrates a parking lever, a rod, and a linking mechanism for linking both members, all of which accord to Embodiment 3 illustrated in FIG. 8.
Figure 10:
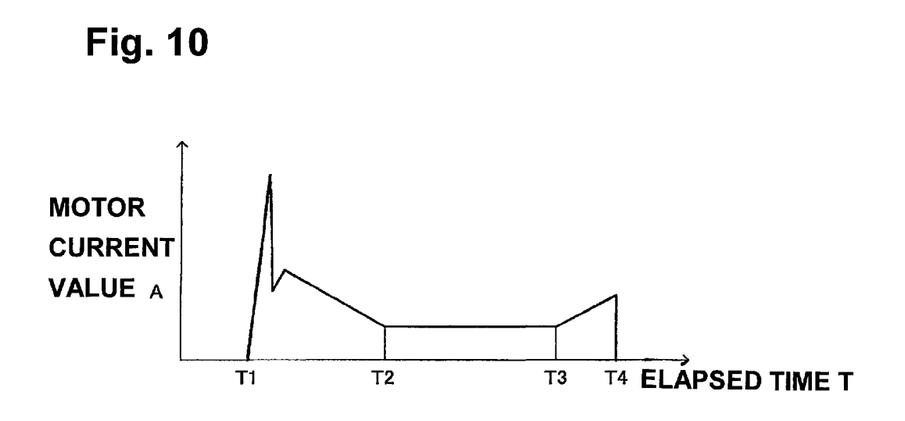
FIG. 10 is a line graph illustrating a relationship between an elapsed time (an elapsed time of an operation of the electric motor) and a motor current value of Embodiment 3 illustrated in FIG. 8.

FIGS. 8 to 10 illustrate an Embodiment 3 of the invention. In the Embodiment 3, the load applying mechanism is constituted by a stopper 27 and a disc spring assembly 28, both of which are illustrated in FIG. 8. Similarly to the stopper 23 of the Embodiment 1, the stopper 27 is fixed to the back plate 11, using a fastener (not illustrated). When the parking lever 17 moves from the operating position to the returning position, the stopper 27 engages with a first linking pin 29a of a linking mechanism 29 and regulates an axial movement of the rod 22e in the returning direction (the left side in the drawing), as illustrated in FIG. 8.

In the Embodiment 3, the electric actuator 20 includes the electric motor 21, the converting mechanism 22, and the linking mechanism 29, as illustrated in FIG. 8. Similarly to the embodiments described above, the electric motor 21 can be rotational driven in the normal/reverse direction. The operation of the electric motor 21 is controlled by the motor control unit (an electric control unit) ECU, by means of the current value corresponding to the rotational loads.

The converting mechanism 22 can convert the rotational movement of the electric motor 21 into a linear movement (an oscillation movement of the parking lever 17 through the linking mechanism 29) of the rod (a screw shaft) 22*e*. During the normal drive mode in which the electric motor 21 rotates in the normal direction, the converting mechanism 22 can cause the rod 22*e* to move in the axial direction from the returning position (a position illustrated in FIG. 8) to the operating position (a position located further on the right side than the position illustrated in FIG. 8, to some extent). During the reverse drive mode in which the electric motor 21 rotates in the reverse direction, the converting mechanism 22 can cause the rod 22*e* to move in the axial direction from the operating position to the returning position.

The converting mechanism 22 includes the pinion 22*a* which is integrally provided on the rotating shaft 21*a* of the electric motor 21, a first intermediate gear 22*b*1 which is rotatably driven by the pinion 22*a*, a second intermediate gear 22*b*2, the output gear 22*c* which is rotatably driven by the second intermediate gear 22*b*2, the screw mechanism 22*d* which is formed in the center (the shaft center) portion of the output gear 22*c*, and the rod 22*e* which is linked to the output gear 22*c* through the screw mechanism 22*d*. The first intermediate gear 22*b*1 and the second intermediate gear 22*b*2 reduce the speed of rotation from the rotating shaft 21*a* and transmit the rotation to the output gear 22*c*.

The first intermediate gear 22*b*1, the second intermediate gear 22*b*2, and the output gear 22*c* are rotatably installed in the housing 22*g*. A thrust bearing 22*h* is installed in a portion between the output gear 22*c* and the housing 22*g*, to receive the reaction force (a force directed to the left side in FIG. 8) from the parking lever 17. The output gear 22*c* can axially move with respect to the housing 22*g*. The electric motor 21 and the housing 22*g* are fixed to the back plate 11, using fasteners (not illustrated).

The screw mechanism 22*d* is constituted by a female thread portion formed on a center (a shaft center) portion of the output gear 22*c* and a male thread portion formed from a central portion to a right end of the rod 22*e*. The male thread portion is screwed to the female thread portion. In the screw mechanism 22*d*, rotation (the rotational movement) of the output gear 22*c* is converted into the axial movement (the linear movement) of the rod 22*e*, in a state where the axial movement (the movement to the left side in the drawing) of the output gear 22*c* is regulated. Furthermore, rotation (the rotational movement) of the output gear 22*c* is converted into the axial movement of the output gear 22*c*, in a state where the axial movement (the movement to the left side in the drawing) of the rod 22*e* is regulated by the stopper 27.

In the screw mechanism 22*d*, the aspects of leads of the female thread portion and the male thread portion are properly set such that, when a reaction force (an axial force) is applied from the parking lever 17, the output gear 22*c* is prevented from rotating. The male thread portion formed on the rod 22*e* is protected, in such a manner that the male thread portion is covered by a boot 22*j* provided in a portion between a tip end portion (a left end portion) of the rod 22*e* and the housing 22*g*. The boot 22*j* can be expanded/contracted in accordance with the axial movement of the rod 22*e*.

When the electric motor 21 rotates in the reverse direction, and thus the output gear 22*c* rotates in the reverse direction, the parking lever 17 moves from the operating position to the returning position. Then, the first linking pin 29*a* engages with the stopper 27, and thus the axial movement of the rod 22*e* is regulated by the stopper 27. Subsequently, the output gear 22*c* is moved, from the returning position illustrated in FIG. 8 in the operating direction (the right side in the drawing), by reverse rotation of the output gear 22*c*. At this time, the disc spring assembly 28 engages with the right end of the output gear 22*c* and elastically regulates or restricts the axial movement (a movement to the right side) of the output gear 22*c*, and then applies the rotational loads to the output gear 22*c*.

In the housing 22*g*, the disc spring assembly 28 is provided in a portion between the housing 22*g* and a right end of the output gear 22*c*, in a state where the disc spring assembly 28 is disposed coaxially to the output gear 22*c*. Furthermore, the disc spring assembly 28 includes a holder 28*a*, three disc springs 28*b*, and a thrust plate 28*c*. In the holder 28*a*, the three disc springs 28*b* and the thrust plate 28*c* are axially movably supported by a small-diameter cylindrical portion and a large-diameter portion is fixed to the housing 22*g*. The holder 28*a* is disposed coaxially to the output gear 22*c*.

The three disc springs 28*b* are disposed between the large-diameter portion of the holder 28*a* and the thrust plate 28*c*, one after the other as illustrated in the drawing (in a state where the large-diameter portions abut on each other and the small-diameter portions abut on each other). In a state illustrated in the drawing, the three disc springs 28*b* are in a substantially free state. The thrust plate 28*c* is disposed in a portion between the disc spring 28*b* on a left end side in the drawing and a right end of the output gear 22*c*. The thrust plate 28*c* can rotatably support the right end of the output gear 22*c*. The thrust plate 28*c* is fixed, in a retained (such that the thrust plate 28*c* cannot move to the left side) manner, to the small-diameter cylindrical portion of the holder 28*a*, at the position illustrated in FIG. 8.

The linking mechanism 29 includes the first linking pin 29*a*, a second linking pin 29*b*, and a pair of link plates (a linking material) 29*c*, as illustrated in FIGS. 8 and 9. The first linking pin 29*a* is installed in a tip end (an end portion) of the rod 22*e*. The first linking pin 29*a* is perpendicular to the rod 22*e* and is parallel to the pin (a support shaft) 17*a* of the parking lever 17. The middle portion of the first linking pin 29*a* is integrally fitted and fixed to a mounting hole 22*e*1 which is formed on an tip end (an end portion) of the rod 22*e*. Both end portions of the first linking pin 29*a* are inserted in the first hole portions 29*c*1 having an elliptical shape, which are respectively formed on the link plates 29*c*, in a state where both end portions can relatively rotate and can move in a major-axis direction (a right-left direction in FIGS. 8 and 9). Furthermore, when the rod 22*e* moves to the returning position to return to the former position, both end portions of the first linking pin 29*a* can abut on the stopper 27, as illustrated in FIG. 8.

The second linking pin 29*b* is installed in an oscillation end portion 17*c* of the parking lever 17 and is arranged to be parallel to the first linking pin 29*a*. In the second linking pin 29*b*, a middle portion is relatively rotatably inserted in a mounting hole 17*c*1 having a circular shape, which is formed on the oscillation end portion 17*c*, and both end portions are relatively rotatably inserted in a second hole portions 29c2 having a circular shape, which are respectively formed on the link plates 29c. Furthermore, the second linking pin 29b is retained in such a manner that each diameter of both end portions is set to be greater than that of the middle portion.

Each link plate 29c can rotate, relative to the end portion of the rod 22e, in a circumferential direction of the first linking pin 29a, in the first hole portion 29c1 in which the first linking pin 29a is inserted. Each link plate 29c can rotate, relative to the parking lever 17, in a circumferential direction of the second linking pin 29b, in the second hole portion 29c2 in which the second linking pin 29b is inserted. The link plate 29c links the first linking pin 29a and the second linking pin 29b. Furthermore, in the configuration described above, the parking lever 17 and the rod 22e which are linked by the linking mechanism 29 are arranged in a state where an oscillation surface of the parking lever 17 and an axis line of the rod 22e are disposed on the same plane. Accordingly, in this embodiment, a driving force from the electric actuator 20 can be smoothly transmitted to the oscillation end portion 17c of the parking lever 17.

The electric parking brake device according to the Embodiment 3 configured as described above has practically the same configuration as the Embodiment 1 described above, except that the axial movement of the rod 22e is transmitted to the parking lever 17 through the linking mechanism 29 and, during a releasing operation of the parking brake, the rotational loads are applied to the output gear 22c through the disc spring assembly 28. Accordingly, the description of the operation of the motor-driving parking brake device according to the Embodiment 3 will not be repeated.

In the electric parking brake device accordingly to the Embodiment 3, during the releasing operation of the parking brake, the relationship between an elapsed time T (an elapsed time of the operation of the electric motor) and a motor current value A is changed as illustrated in FIG. 10. In FIG. 10, T1 indicates the time at which the parking brake switch is released and T2 indicates the time at which a motor starting current (the motor starting current itself is the well-known value) is stable. In addition, T3 indicates the time at which the output gear 22c comes into contact with the thrust plate 28c and T4 indicates the time at which the disc spring 28b is elastically deformed by a predetermined amount, and thus the rotational loads (the motor current value A) obtained by the reverse rotation drive of the electric motor 21 reaches a predetermined value. Thus, the motor control unit (an electric control unit) ECU has a setting in which, even when the rotational loads (the motor current value A) obtained by the reverse rotation drive of the electric motor 21 reach the predetermined value, due to the motor starting current, during the period ahead of T2, the operation of the electric motor 21 is prevented from being stopped. Such a setting is also common to Embodiment 1 and Embodiment 2 described above.

In the Embodiment 3 described above, the linking mechanism 29 which links the end portion of the rod 22e and the oscillation end portion 17c of the parking lever 17 includes the first linking pin 29a, the second linking pin 29b, and the link plates 29c, 29c described above. The movement (an oscillative movement with the support pin 17a as a center) of the parking lever 17, relative to the rod 22e moving linearly, is received by the movement of the link plates 29c, 29c rotating about pins (axes) of the first linking pin 29a and the second linking pin 29b.

In the Embodiment 3, the first hole portion 29c1 of each link plate 29c is formed in an elliptical shape extending in the movement direction (in the right-left direction in the drawing) of the link plate 29c. Therefore, dimensional variations of the components or the movement of the link plate 29c during a service brake operation (a brake operation by the operation of the wheel cylinder 15) of the drum brake 10 can be absorbed by the movement of the first linking pin 29a in the first hole portion 29c1 having an elliptical shape. Furthermore, in Embodiment 3 described above, when the rod 22e moves to the returning position, the first linking pin 29a can abut on the stopper 27. Accordingly, the rod 22e can be stopped in the returning position, in such a manner that the first linking pin 29a abuts on the stopper 27. Therefore, it is also possible to stop the parking lever 17 which is linked to the end portion of the rod 22e in the linking mechanism 29. Furthermore, it is possible to regulate or restrict unnecessary movements of the rod 22e, the parking lever 17, and the like.

In the Embodiment 3 described above, the disc spring assembly 28 (which has the disc spring 28b (a disc-shaped plate spring) as a component) is applied as a rotational load applying member. In this case, the rotational load applying member is disposed coaxially to an output gear (22c). In a state where the axial movement of a rod (22e) is regulated by a stopper (27), when the output gear (22c) is moved in the operating direction by the reverse rotation of the output gear (22c), the rotational load applying member elastically regulates the axial movement of the output gear (22c), in such a manner that the rotational load applying member engages with the output gear (22c), and, furthermore, the rotational load applying member applies the rotational loads to the output gear (22c). However, a load applying member which has, for example, a wave-shaped plate spring (a wave spring) as a component may be applied as such a rotational load applying member.

In the Embodiment 3 described above, the first hole portion 29c1 of each link plate 29c is formed in an elliptical shape and the second hole portion 29c2 of each link plate 29c is formed in a circular shape. However, the first hole portion 29c1 of each link plate 29c may be formed in a circular shape and the second hole portion 29c2 of each link plate 29c may be formed in a elliptical shape. In Embodiment 3 described above, when the rod 22e moves to the returning position, both end portions of the first linking pin 29a can abut on the stopper 27. However, when the rod 22e moves to the returning position, one end portion of the first linking pin 29a may abut on the stopper 27.

In the Embodiment 3 described above, the linking mechanism 29 which links the end portion of the rod 22e and the oscillation end portion 17c of the parking lever 17 includes the first linking pin 29a, the second linking pin 29b, and the pair of link plates 29c, 29c. However, when the end portion of the rod 22e and the oscillation end portion 17c of the parking lever 17 are formed in a yoke shape (bifurcated shape) and one link plate 29c is interposed therebetween, the linking mechanism 29 may have a configuration (capable of reducing the number of parts) constituted by the first linking pin 29a, the second linking pin 29b, and one link plate 29c.

What is claimed is:

1. An electric parking brake device in which, when a parking lever in a drum brake is driven from a returning position to an operating position in accordance with normal driving of an electric actuator, a brake shoe is driven from the returning position to the operating position and, when the parking lever is driven from the operating position to the returning position in accordance with reverse driving of the electric actuator, the brake shoe is driven from the operating position to the returning position, wherein the electric actuator includes:

an electric motor which can be rotationally driven in a normal/reverse direction and of which an operation is controlled by a motor control unit which applies an electric current to the electric motor that varies in accordance with rotational loads applied to the electric motor;

a converting mechanism which can convert a rotational movement into a linear movement and which can move the parking lever from the returning position to the operating position during a normal drive mode in which the electric motor rotates in the normal direction, and which can move the parking lever from the operating position to the returning position during a reverse drive mode in which the electric motor rotates in the reverse direction; and a load applying mechanism including a spring which is elastically deformable to, while the parking lever is moving in accordance with rotation of the electric motor in the reverse direction, increase the spring force thereof by a movement of components of the converting mechanism, so that the load applying mechanism applies loads to the converting mechanism which, after the parking lever has reached the returning position and the motor control unit continues to drive the electric motor, reach values that cause the converting mechanism to apply predetermined rotational loads to the electric motor, whereby the rotational loads applied to the electric motor reach the predetermined rotational loads only after the parking lever has reached the returning position;

wherein the motor control unit stops the rotation of the electric motor in the reverse direction when a value of the electric current which is applied to the electric motor by the motor control unit reaches a predetermined value which corresponds to the predetermined rotational loads, whereby the motor control unit stops the rotation of the electric motor only after the parking lever has reached the returning position.

2. The electric parking brake device according to claim 1, wherein the converting mechanism includes a rod which is linked to the parking lever through a linking mechanism and which can axially move in an operating/returning direction of the parking lever and an output gear which has a thread portion screwed to a thread portion formed on the rod and which is rotationally driven by the electric motor, in a state where an axial movement of the parking lever in the returning direction is regulated in the returning position, wherein the load applying mechanism further includes a stopper which engages with the rod and which regulates the axial movement of the rod in the returning direction, in a state where the parking lever moves from the operating position to the returning position in accordance with reverse rotation of the electric motor, and wherein the spring, which is disposed coaxially to the output gear, engages with the output gear and elastically regulates the axial movement of the output gear, when the output gear moves in the operating direction in accordance with reverse rotation of the output gear, in a state where the axial movement of the rod is regulated by the stopper.

* * * * *